UNITED STATES PATENT OFFICE.

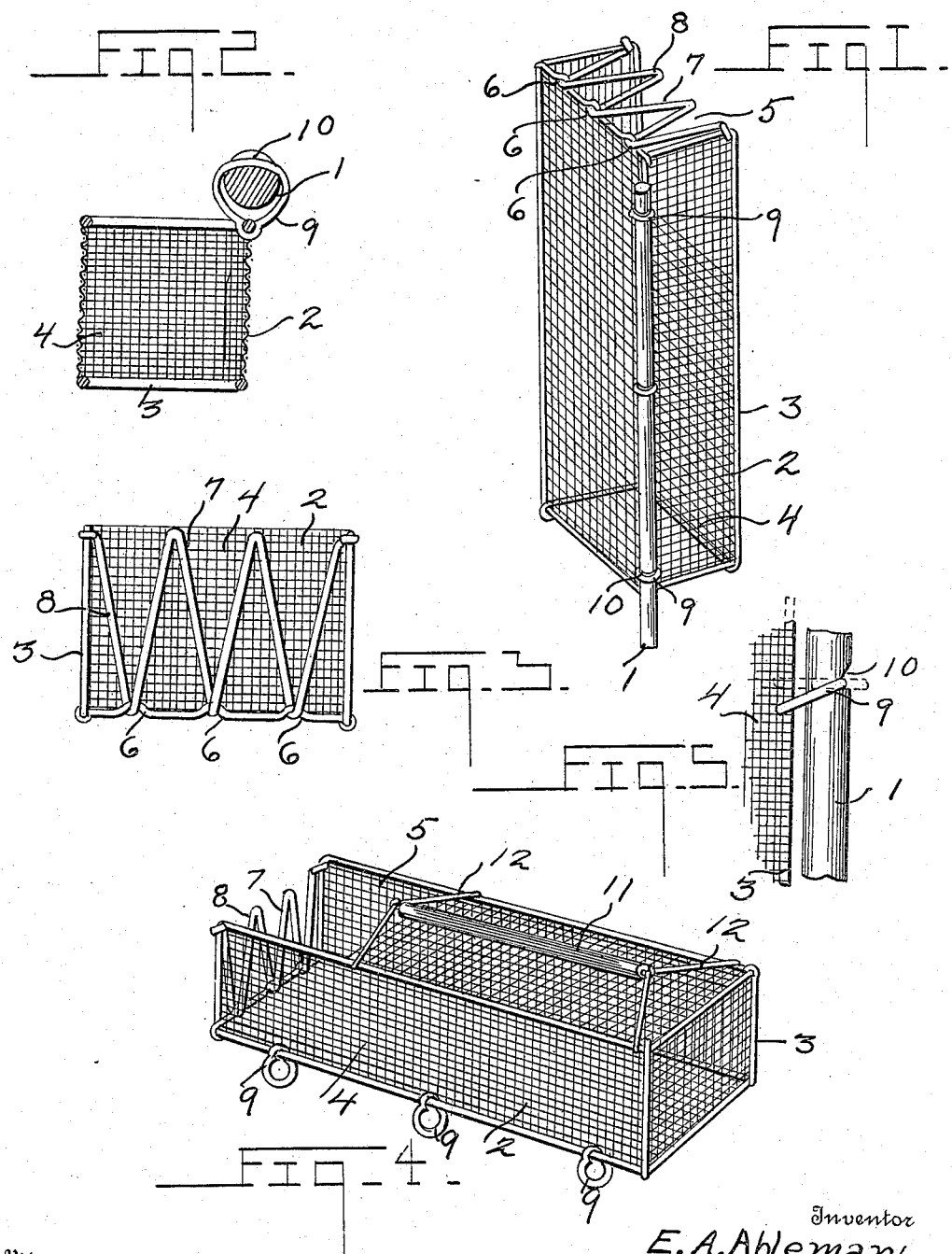

EPHRAIM A. ABLEMAN, OF GHEEN, MINNESOTA.

FRUIT-PICKER.

942,302.

Specification of Letters Patent.

Patented Dec. 7, 1909.

Application filed June 23, 1909. Serial No. 503,862.

*To all whom it may concern:*

Be it known that I, EPHRAIM A. ABLEMAN, a citizen of the United States, residing at Gheen, in the county of St. Louis and State of Minnesota, have invented certain new and useful Improvements in Fruit-Pickers, of which the following is a specification.

This invention relates to new and useful improvements in fruit pickers and has for its object to provide a simply constructed and durable device of this character, which may be readily thrust between the branches of fruit trees so that the fruit may be readily gathered therefrom.

Another object is to provide a fruit picker which comprises a wire rectangular basket or frame secured to one end of a suitable operating handle by means of which the same may be easily manipulated.

A further object is to provide a novel means for attaching the fruit receptacle to the end of the handle so that the same may be readily removed therefrom and another handle secured to the basket frame so that it may be easily carried from place to place.

A still further object is to provide new and novel means secured in one end of the basket by means of which the fruit will be easily detached from the tree and deposited within the same.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like numerals of reference indicate similar parts in the several views, Figure 1 is a perspective view of my improved fruit picker, the lower portion of the handle thereof being broken away. Fig. 2 is a horizontal section of the same, Fig. 3 is an enlarged top plan view of the basket. Fig. 4 is a perspective view of the basket detached from the operating handle, and having the carrying handle secured thereto. Fig. 5 is a detail view of the manner of attaching the operating handle to the receiving basket.

Referring to the drawings, 1 indicates the operating handle, which may be of any desired length, and has the fruit receiving basket 2 detachably secured to the upper end thereof. The basket 2 comprises the stout wire frame 3, preferably rectangular in form and has secured thereto the wire netting 4. The netting 4 extends entirely around the frame and also covers the bottom thereof. Upon one side, however, the netting does not extend entirely to the top of the receiver, so that a short open space 5 will be provided through which the fruit may pass when it is desired to empty the receiver.

At the upper open end of the receiver at one side thereof, the frame wire is formed into a plurality of loops or eyes 6, which are adapted to receive the wire 7 which forms, in effect, the top of the receiver. This wire is very heavy and is bent between its ends into a plurality of convolutions 8 in which the stem of the fruit is received as will be later described. The extremities of the wire 7 are secured to the frame 3, while the ends of the intermediate looped portion are disposed in the eyes 6.

The convolutions 8 extend from the rear of the receiver frame to the front open portion 5 thereof. Rings 9 are secured to one edge of the frame 3 adjacent to the bottom and top thereof and have a slight vertical movement, whereby the same will be disposed at a slight inclination to the vertical axis of the handle 1 when the receiver is in position upon the same. The rings 9 are received in notches or recesses 10 in the bar 1, whereby the movement of the receiver 2 will be limited thereon. It will thus be seen that when it is desired to remove the receiver from the handle 1 it must be lifted until the rings are disposed at a right angle to the axis of the operating handle, when the handle may be withdrawn and entirely disconnected from the frame 3. When the receiver is operatively connected with the handle 1, its weight will be amply sufficient to retain the same in position thereon against any unintentional vertical movement. After the operating handle has been removed, a carrying handle 11 may be secured thereto, so that the receiver may be conveniently carried from place to place. This handle has the wires 12 secured to the ends thereof which extend to opposite sides of the frame 3 and are provided with hooks upon their extremities by means of which the same may be readily secured to the frame wires.

In operation the receiver 2 is secured upon the outer end of the operating handle 1, and is thrust between the branches of the tree from which the fruit is to be picked. The stems of the fruit are engaged in the convolutions 8 of the wire 7, and by imparting a slight sidewise movement or downward pull upon the receiver 2, the fruit will be easily detached from the branches without the slightest danger of injury to the same, and deposited within the receiver. It will be seen that in this manner the fruit may be gathered very quickly, as a plurality of interstices is provided in which the stems may be received. Such a construction is admirably adapted for the picking of cherries and other small fruit which grow in clusters and the gathering of which is extremely tedious and tiresome. As the receiver is extremely light, it may be rapidly moved between the branches of the trees whereby the labor involved in the gathering of the fruit is materially decreased. After the receiving receptacle has been entirely filled, the operating handle may be removed therefrom as before described and the handle 11 attached to the frame, so that the gathered fruit may be conveniently carried to the place where it is to be emptied.

From the foregoing, it will be seen that I have provided a fruit picker which is extremely inexpensive in its construction while at the same time the durability and efficiency of the same have been retained. It will be understood, of course, that the construction above described may be applied equally as well to receivers of cylindrical or other shapes, with but slight variation in the manner of assembling the several parts. The ease of operation and convenience in handling the fruit after the same has been gathered combine to provide a device which is in every way highly useful and practicable.

It will be understood, that where the fruit is easily accessible, the receiver may be manipulated by means of the carrying handle 11. In order to allow the receiver being inserted between adjacent branches of trees, the removable handle 1 is attached at one corner of the frame 3. If desired, however, this handle may be attached to the middle of the back of the receiver, opposite to the side which is provided with the upper open portion 5. By attaching the handle to one corner of the frame, the receiver may be easily moved and the fruit gathered in cases where the trees are extremely bushy and there are many branches. If the receiver were positioned at right angles to the handle, this would be rendered more or less difficult.

What is claimed is:

1. In a fruit picker, a wire frame rectangular in section having wire netting secured to the sides and the bottom thereof, rings secured to one edge of said frame, an operating handle extending through said rings, notches in said handle adapted to receive said rings, loops formed upon the upper end of said frame, and a wire bent upon itself to form a plurality of convolutions, one end of each of said convolutions being secured in one of said loops and the extremities of said wire secured to said frame.

2. In a fruit picker, a wire frame rectangular in section having wire netting secured to the sides and the bottom thereof, the netting upon one side of said frame terminating below the upper end of the same and the upper end of the frame being open, a plurality of rings pivotally secured upon one edge of said frame, an operating handle extending through said rings, recesses formed in said handle to receive said rings and limit the downward movement of said frame, a plurality of loops formed on one side of the upper end of said frame, and a wire bent to form a plurality of convolutions, the extremities of said wire being secured to said frame, the intermediate portions of said wire secured to said loops and extending outwardly over the open end of said receiver.

3. In a fruit picker a receiver rectangular in cross section, a plurality of rings pivotally secured to one edge of the receiver, a notched operating handle extending through said rings, said rings being engaged in the notches the rings being normally positioned obliquely with relation to the longitudinal axis of the handle to support the receiver, the upper end of the receiver being open, a wire bent upon itself to form a plurality of convolutions and disposed in the open end of the receiver, and means for securing the extremities of said wire and one end of each of the convolutions to the receiver.

In testimony whereof I affix my signature, in presence of two witnesses.

EPHRAIM A. ABLEMAN.

Witnesses:
PETE SKRALA,
JACOB SCHUS.